(12) United States Patent
David

(10) Patent No.: US 8,405,236 B2
(45) Date of Patent: Mar. 26, 2013

(54) BRUSHLESS DC TURBO-HYDRO ELECTRIC GENERATOR

(76) Inventor: Juan V. David, Palms, MI (US)

( * ) Notice: Subject to any disclaimer, the term of this patent is extended or adjusted under 35 U.S.C. 154(b) by 0 days.

(21) Appl. No.: 12/799,274

(22) Filed: Apr. 21, 2010

(65) Prior Publication Data

US 2012/0007364 A1   Jan. 12, 2012

Related U.S. Application Data

(60) Provisional application No. 61/214,249, filed on Apr. 21, 2009.

(51) Int. Cl.
 *F03B 13/10* (2006.01)
(52) U.S. Cl. ............................. 290/43; 290/54
(58) Field of Classification Search ............ 290/42, 290/43, 53, 54; 415/2.1, 3.1; 60/398, 698; 310/156.01, 156.36, 87
See application file for complete search history.

(56) References Cited

U.S. PATENT DOCUMENTS

| 4,720,640 | A | * | 1/1988 | Anderson et al. | 290/43 |
| 5,821,170 | A | * | 10/1998 | Klingbeil et al. | 438/745 |
| 6,417,578 | B1 | * | 7/2002 | Chapman et al. | 290/44 |
| 6,885,114 | B2 | * | 4/2005 | Baarman et al. | 290/43 |
| 7,091,628 | B1 | * | 8/2006 | Balt | 290/54 |
| 2003/0193198 | A1 | * | 10/2003 | Wobben | 290/54 |
| 2008/0048453 | A1 | * | 2/2008 | Amick | 290/44 |

* cited by examiner

*Primary Examiner* — Tho D Ta

(57) ABSTRACT

This Generator utilizes waters motion rotating NdFeB rotor-blades within aluminum trapezoidal bars to generate electricity. The generator includes a moving magnetic field, wherein magnetic neodymium-iron-boron's embedded in turbine blades uniformly, with alternating polarity, circumferentially distributed about central axis drive shaft. The generator includes rotational speed controlled by secondary internally sourced electricity created by additional coils forming an internal generator fixed to the driveshaft independent of the turbine blades. Stationary Aluminum bars are induced to electrical conducting by internal movement of the magnetic field on the center axis and through aluminum bars, whereby the magnetic field cuts across the electrical conducting means in a uniform direction when the magnetic field is rotated, inducing a unidirectional electric signal in the Aluminum conductor bars thus completing the field. Electrical current is transferred from the exterior shell by means of electrical wire connected to the circuit path of the bars.

3 Claims, 11 Drawing Sheets

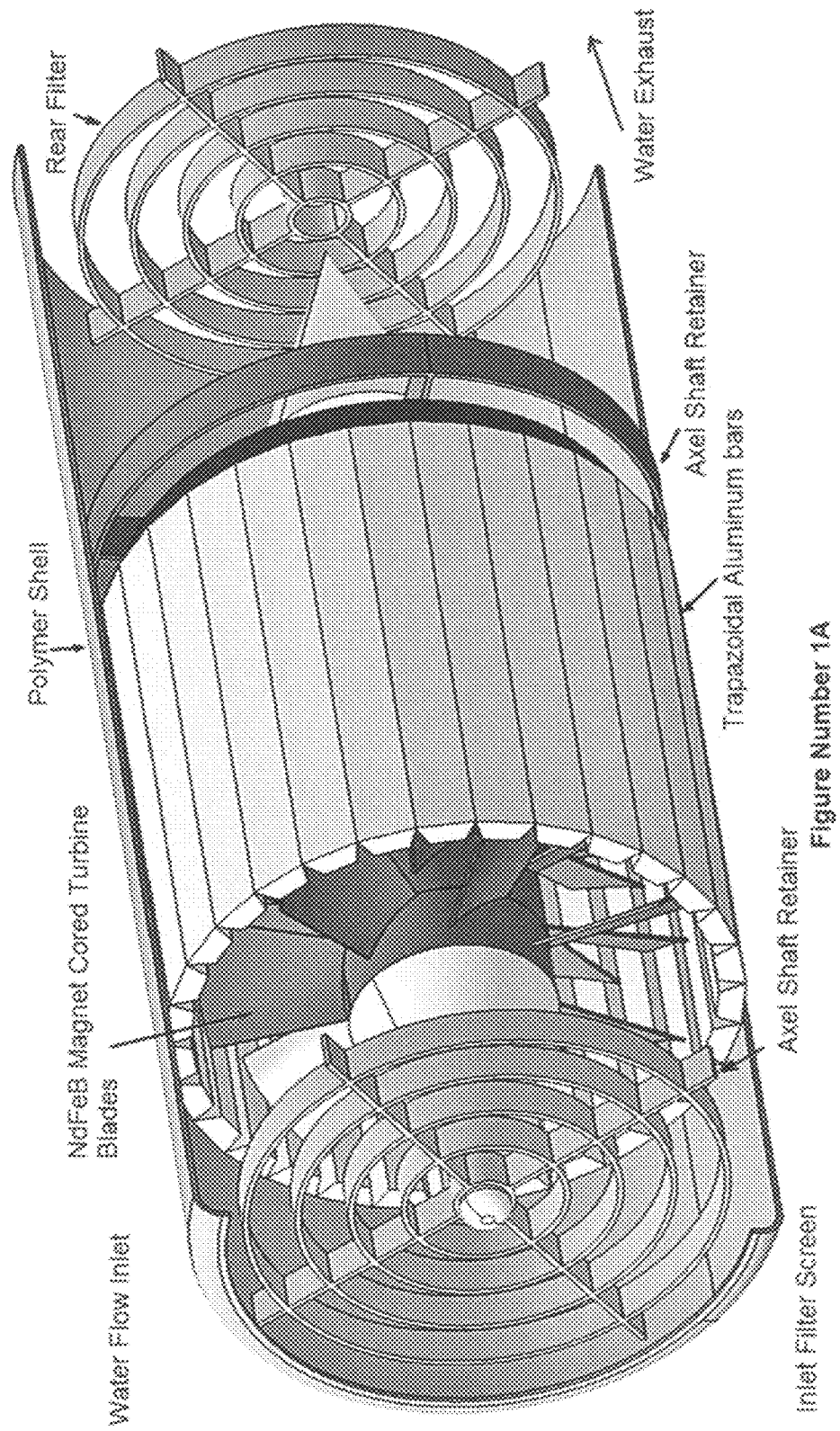

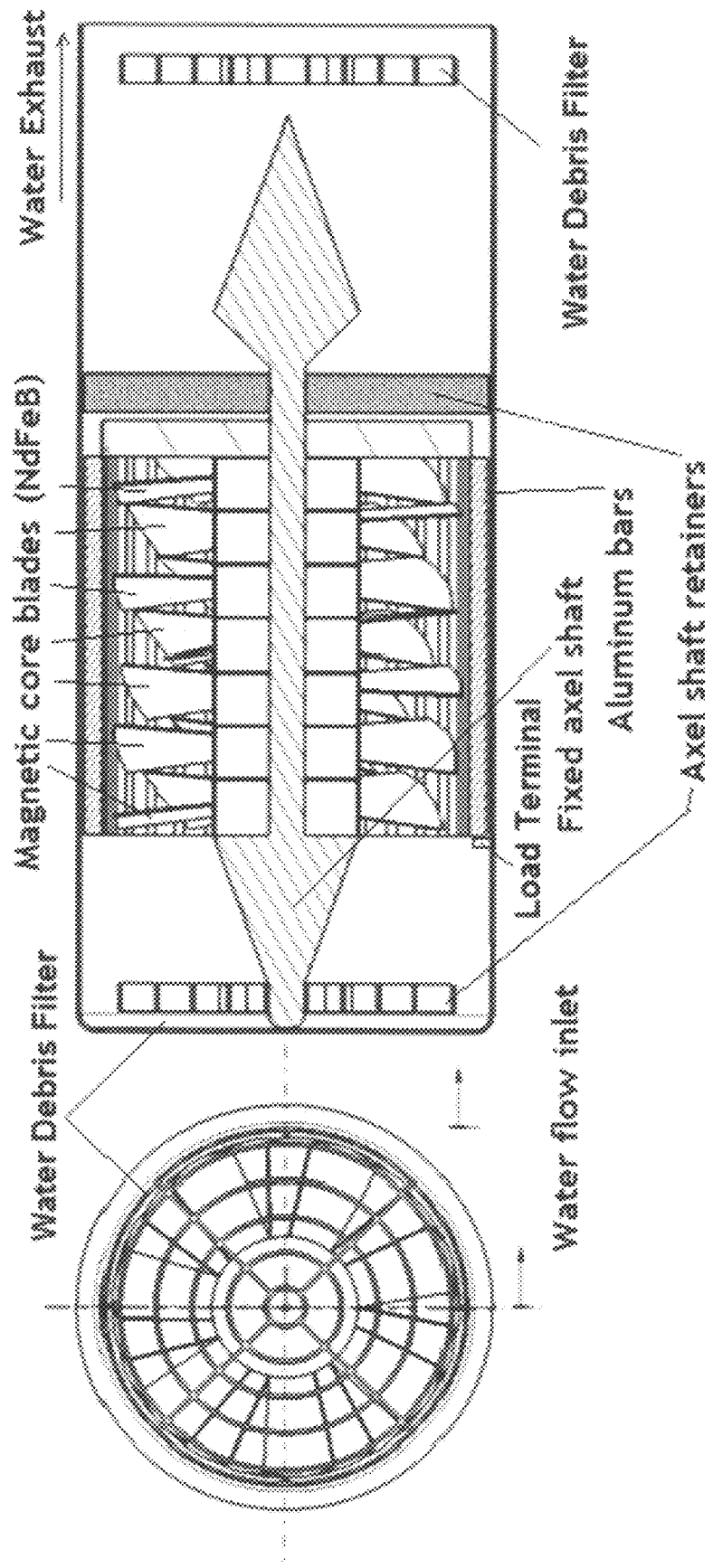
Cutaway Figure 1B

Fixed Axel Shaft: BLDC Generator

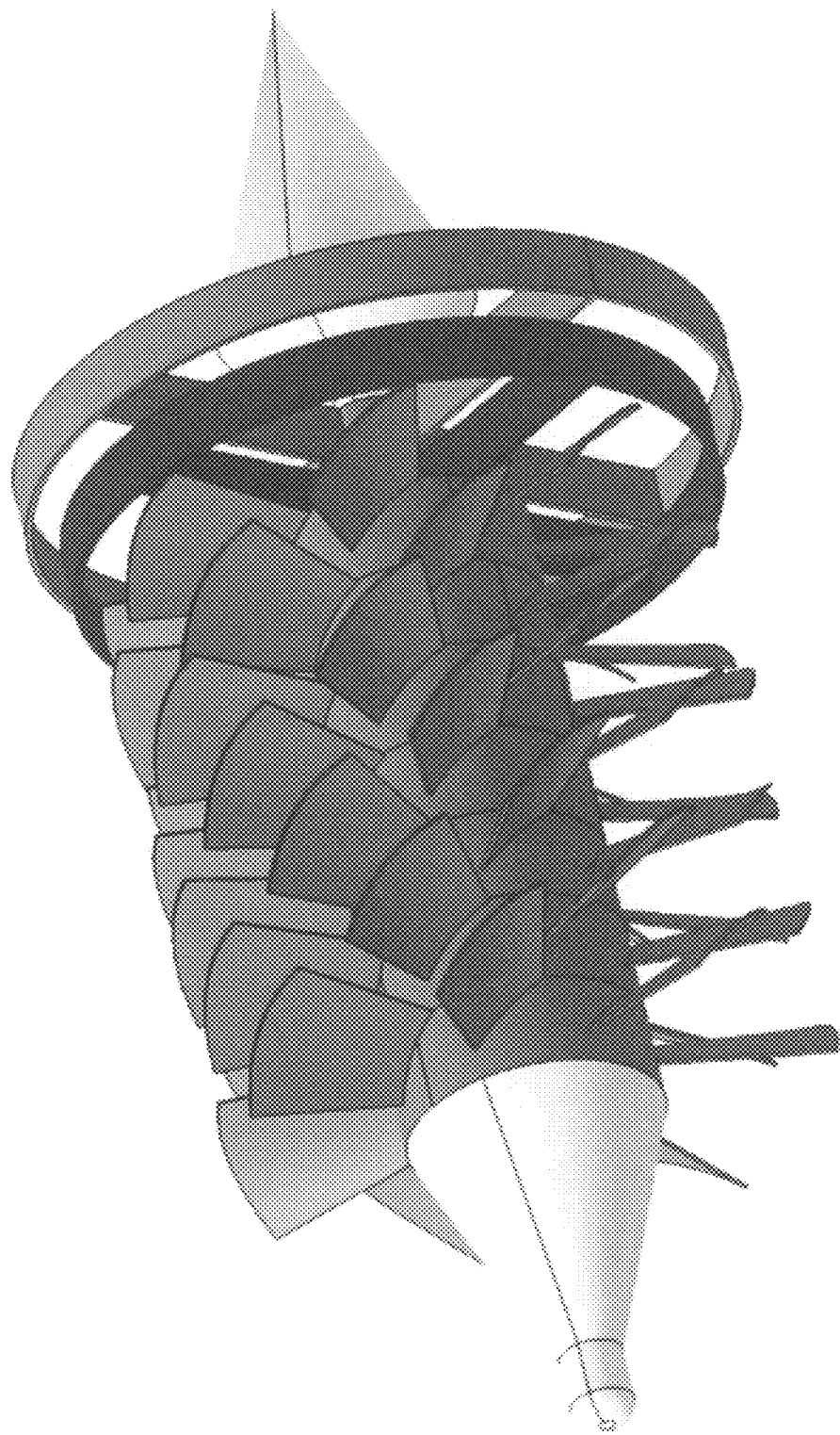
Figure 1D: NdFeB Blades, Fixed Axel Shaft, Rear Retainer Assembly BLDCG

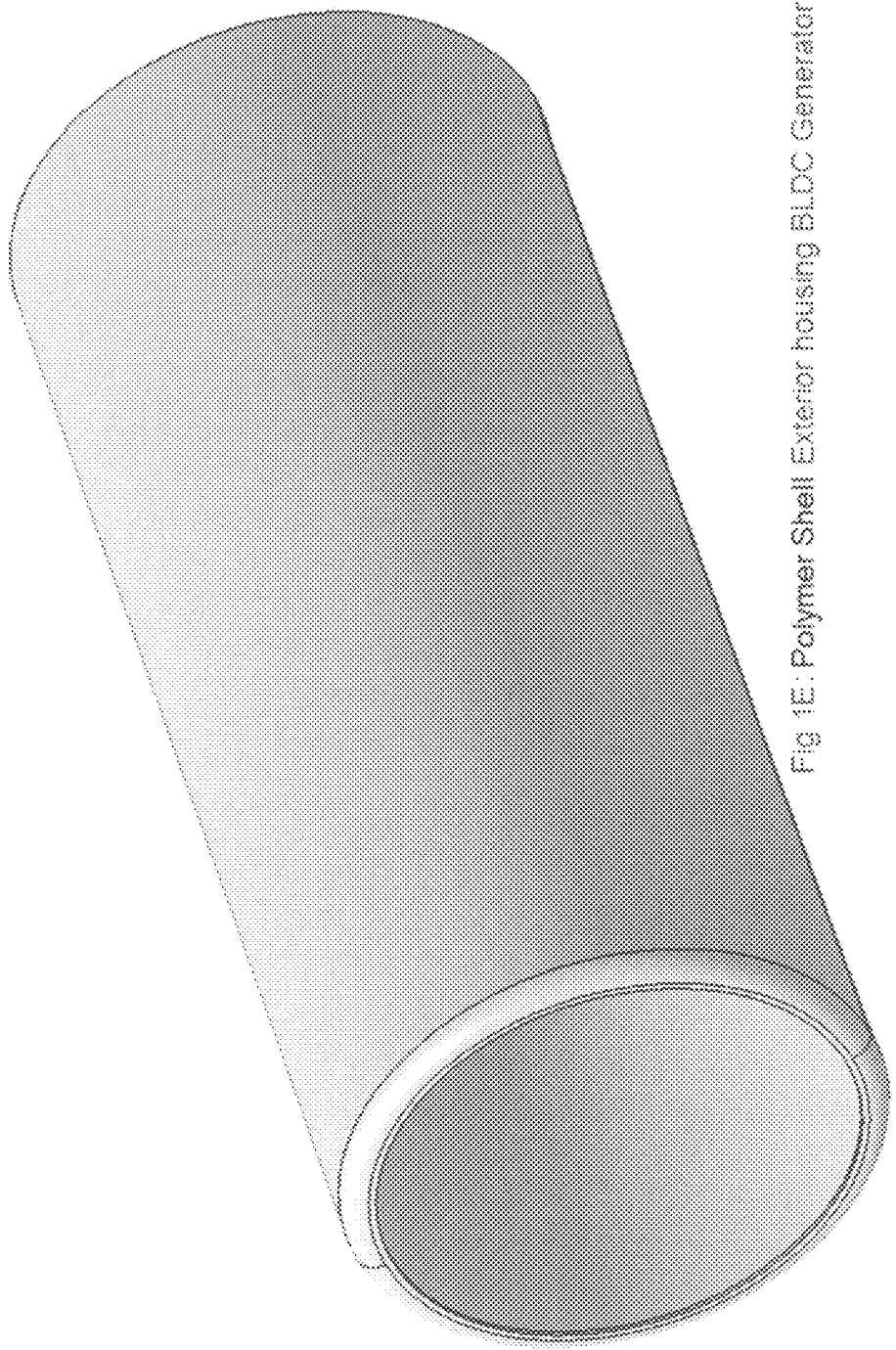
Fig 1E: Polymer Shell Exterior housing BLDC Generator

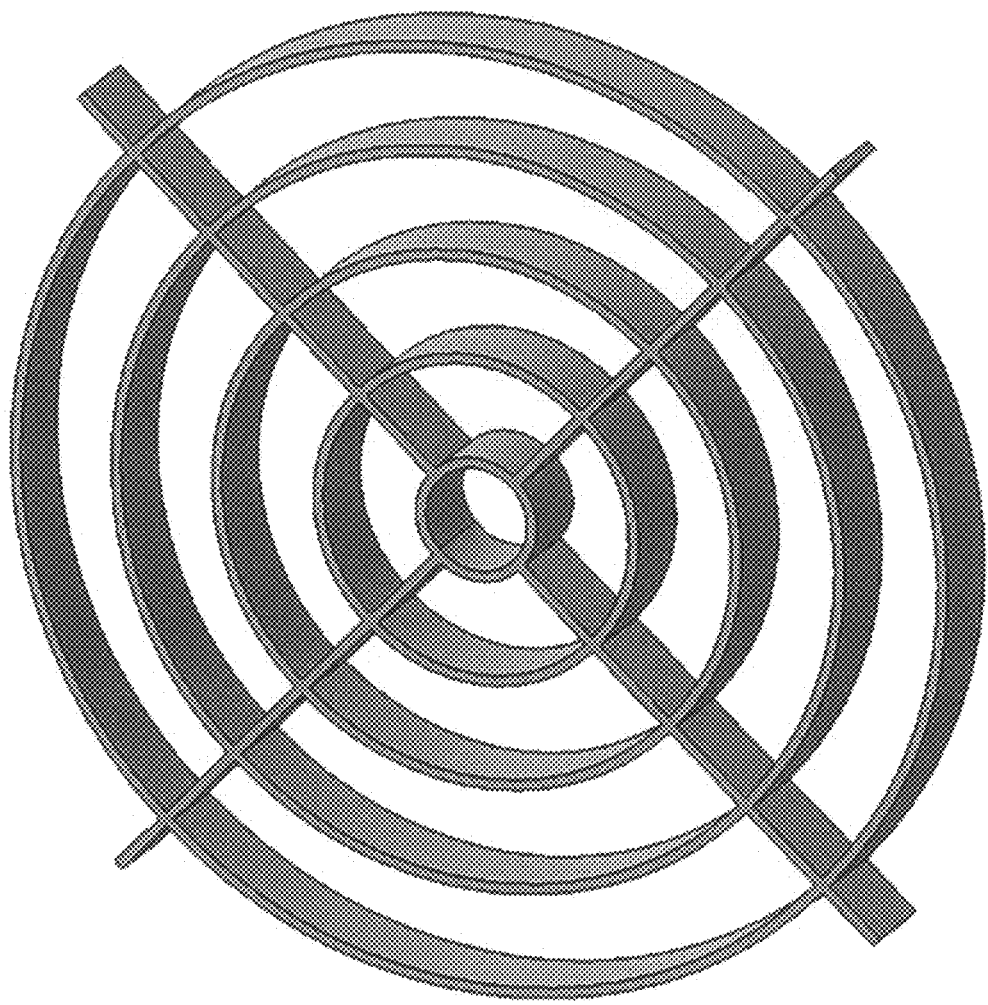
Fig 1F: Front BLDC Generator Filter/Shaft Retainer
(Constructed of Magnetic Material)

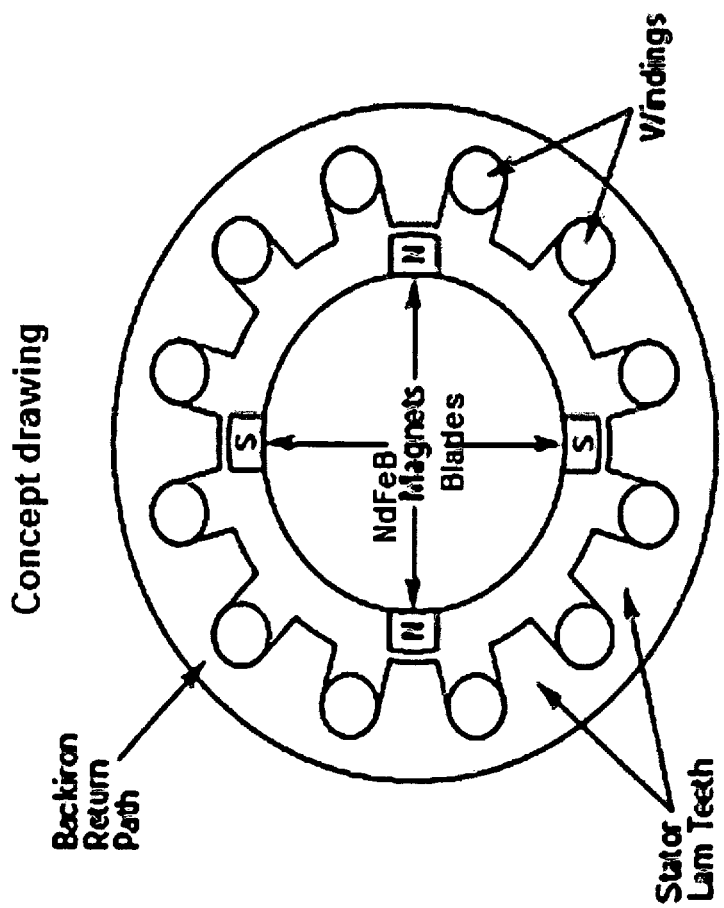

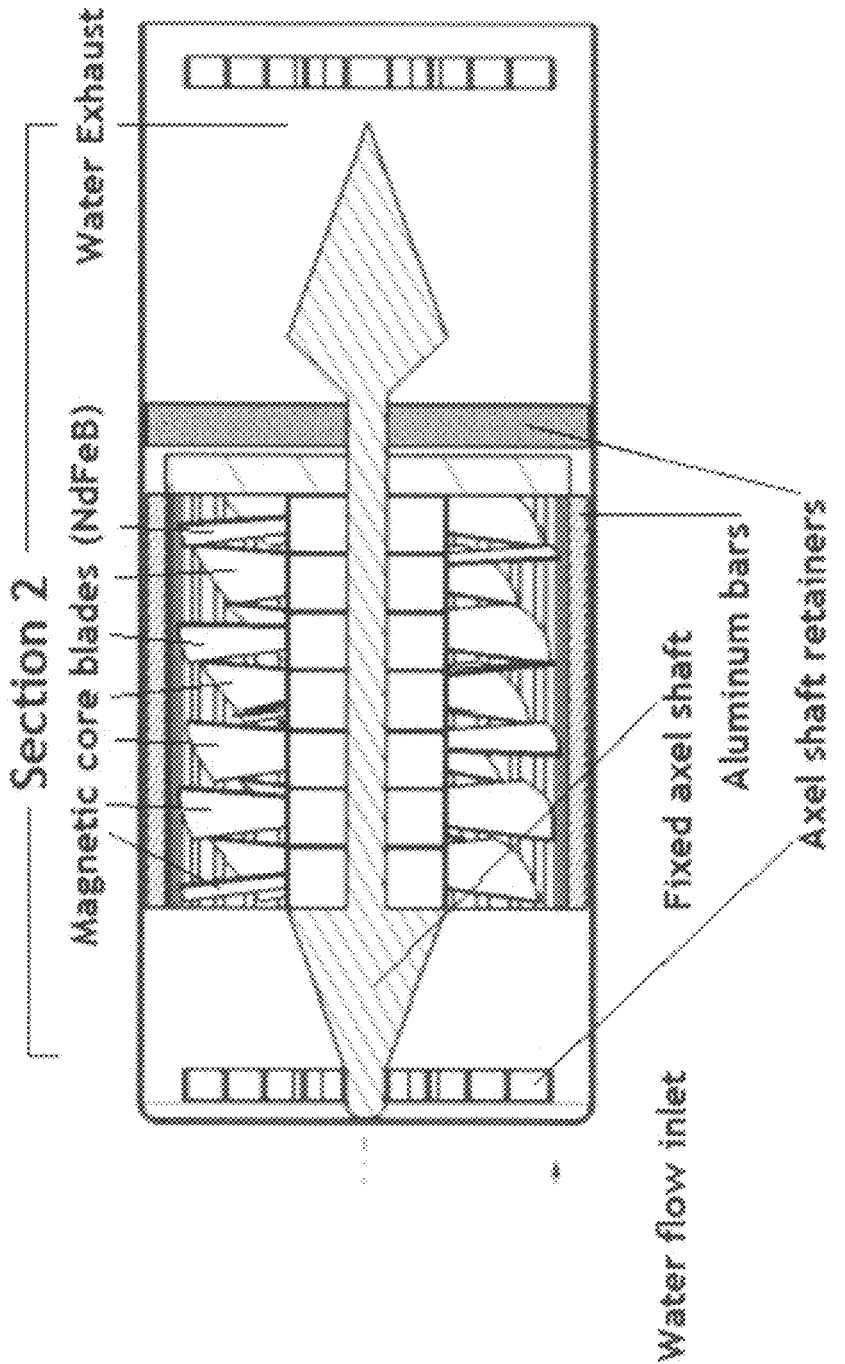

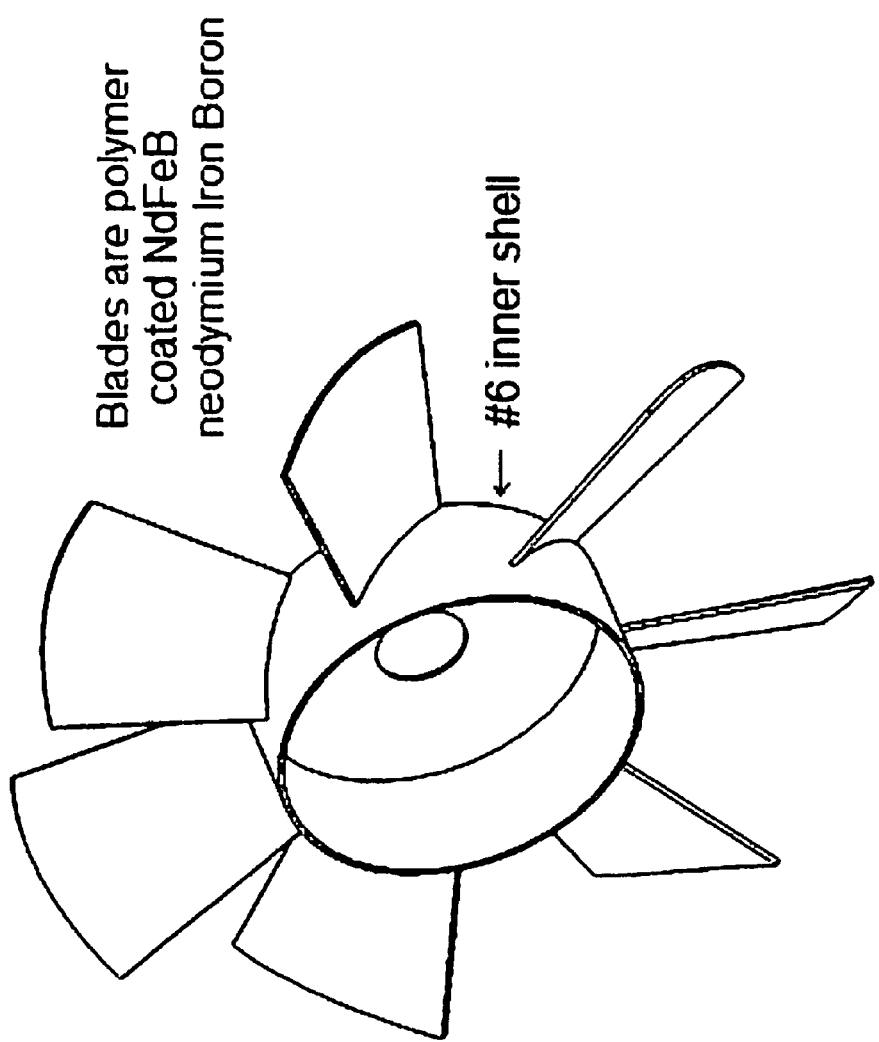
Figure 5 - Wireframe Turbine Blade Assembly

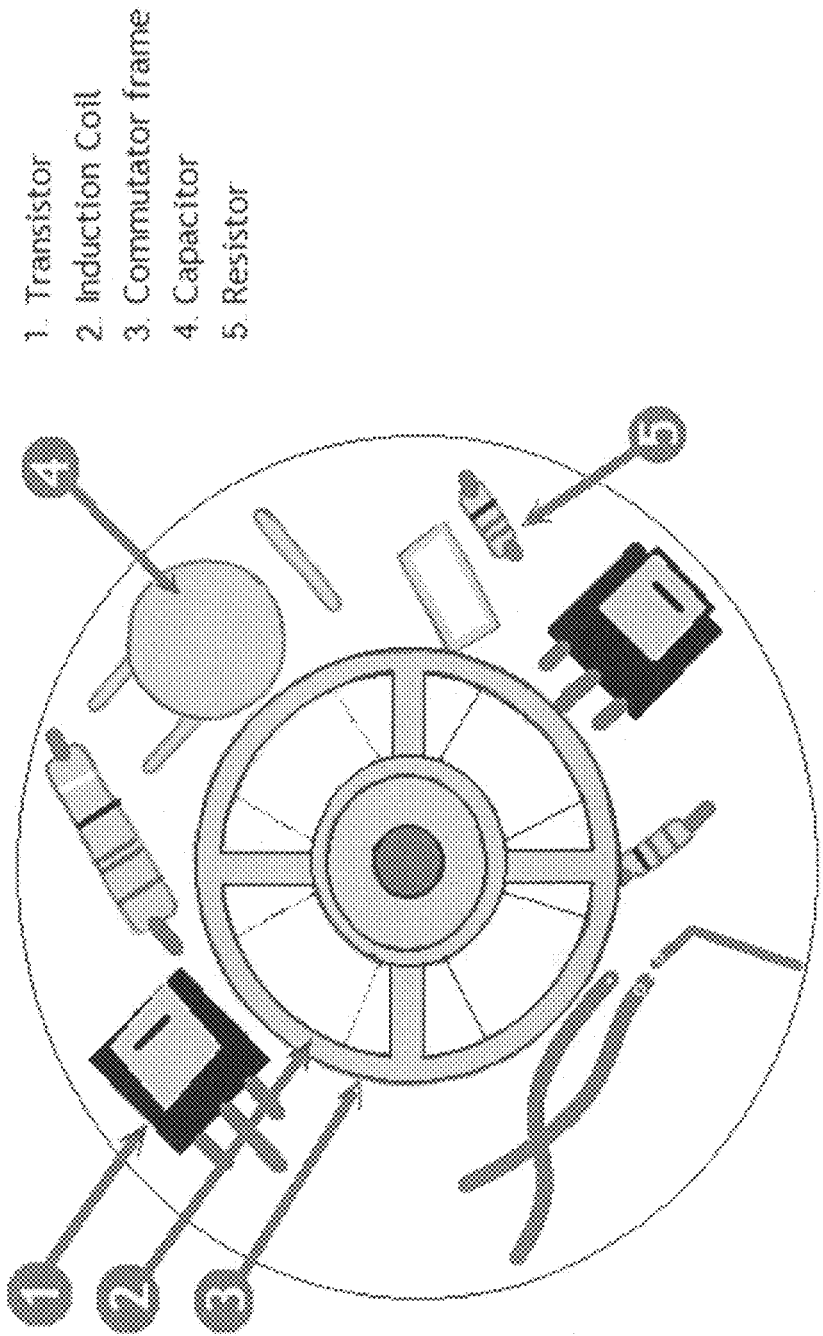

BRUSHLESS DC TURBO-HYDRO ELECTRIC GENERATOR

FIELD OF THE INVENTION

The invention relates to a marine current power installation, in particular, a marine current power installation which uses energy from the tidal ebb and flow of marine currents which constantly occur in the oceans, rivers, and lakes.

BACKGROUND OF THE INVENTION

About 70.8% of the surface the Earth's terrain is covered by water, with much of the continental shelf below sea level.

As the population of our planet approaches seven billion, there is an increasing demand for greater amounts of electrical power and a need to minimize pollution of the environment caused by generating said electrical power.

- U.S. Pat. No. 7,471,009 (Davis, et al.) entitled "Underwater Ducted Turbine" discloses a turbine for generating electrical power from water or air flow comprising at least one rotor disk having a plurality of hydrofoil blades, a cylindrical housing, and a generator means. A rim generator comprising a magnet race rotor rim and fixed stator coils in the housing is used. The apparatus is fitted with a screen to stop the ingress of debris and marine life, and a skirt augmenter device to reduce the Betz effect. The apparatus is preferably for sub-sea deployment and driven by tidal currents, but may be powered by river current or wave driven air or by wind.
- U.S. Pat. No. 7,279,803 (Bosley) entitled "Ocean Current Power Generator" discloses an apparatus and method for generating electricity from the movement of seawater in ocean currents. An impeller is set within a stationary frame. The impeller rotates around a non-moving shaft. There are four sets of electromagnetic coils, two of which are stationary, and two of which rotate with the impeller.
- U.S. Pat. No. 6,967,413 (Atiya) entitled "Tidal Energy System" is a structure capable of extracting energy from the potential and kinetic energies of the tides, as well as from ocean waves and offshore wind. Its components operate synergistically in multiple capacities to extract energy from these sources. The system is structured so that it can be operated integrally with electrolyzer and fuel cell technology to produce on demand power thus eliminating the pulse character of conventional tidal power.

None of the above inventions and patents, taken either singly or in combination, is seen to describe the present invention as claimed.

It is an object of the present invention to implement an apparatus for a Brushless DC turbo-hydro electric generator that overcomes some of the disadvantages of the prior art.

There is a need, therefore, for an efficient brushless DC turbo-hydro electric generator, which can harness tidal energy with a minimal environmental impact. The energy produced should be dependable, limitless, and free of greenhouse gases.

The Brushless DC Turbo-Hydro electric generator of the present invention satisfies these needs

BASIC ELECTRICAL FUNDAMENTALS OF TURBO-HYDRO ELECTRICAL BRUSHLESS DC GENERATION

The science involved with the creation of electricity is basic. When a conductive wire is passed through a magnetic field, electrical current is induced in the wire. It should be noted that an electric motor may function as an electric generator and visa-versa. Referring now to FIG. 2, the standard way of creating the electric current is allowing a wire wrapped rotor spinning in a circumferential magnetic field located in the stator with brushes which contact the wires extruded into a commutator on the spindle of the rotor shaft. As the rotor spins and creates electric current the brushes contact the commutator to allow the electric current to be connected to exterior power for the generator or source of power for the motor. With the advent of inexpensive computers and power transistors, it has become possible to "turn the electric motor/generator inside out", placing the commutator function on the outside of the magnetic field moving cyclically on the spindle, and thus eliminate the brushes. Again, with a brushless turbo-hydro DC motor/generator, the permanent or electro magnets can be placed on the rotor, or the electromagnets can be positioned on the rotor. A processor is then connected to high-power transistors to charge up the electromagnets as the shaft turns.

Some of the novel features of the turbo hydro generator of the present invention, either taken alone or in combination, are:

- The location of magnetic field being generated in rotating blades in the center of the field
- The type of neodymium-iron-boron permanent magnets
- The location of the magnets is within the multiple turbine blades which supply mechanical drive to the shaft on which they are placed via the motion of water thus rotating the shaft
- The magnetic field rotates through the aluminum bars of traditional commutation device and thereby creating electrical current.
- As a computer controls the generator/motor electrical output and current instead of mechanical brushes, operation is more precise. The computer can factor in the speed of the generator. Thus brushless generation of electrical current is more efficient. The rotor blades alignment is controlled to account for variations in speed and direction of the source of power, water.
- There is less friction with fewer moving components, less heat, and zero electrical noise.
- Most metallic components are embedded in polymer or Teflon®, limiting or eliminating oxidation and there are fewer components to maintain.
- As the permanent or electromagnets are located on the rotor, they are kept cool (see FIGS. 1A and 1B).
- There may be multiple permanent or electromagnets on the rotor for more current production and precise control.
- Due to smaller and more numerous blades than the typical water generation methods, and permanent Neodymium-iron-boron magnets integrated into smaller hydraulic turbine blades centered within the shell housing which contains the trapezoidal bars forming the electrical current commutation rather than copper coils, the shaft and turbine blades turn more efficiently and are less easily damaged than the current style of generators which have massive 8 to 30 foot long, 2-4 foot wind turbine blades rotating a shaft to supply power to a brushless DC generator and open to the natural elements for damage.

Purpose/Use: Power Generation

A broad range of configurations are possible, some as simple as adding the desired shaft adapter which controls the turbine blades direction to follow any flow of water as source of power. The generator magnetic turbine blade configuration can be altered to allow reversed magnetic fields on either end of the drive shaft to enable creation of alternating current (AC), or two turbo hydro generators of the present invention can be aligned next to each other in opposite directions accommodating changes in the flow of water current and producing either AC or DC current depending on simple switching. In general, the turbo hydro generator of the present invention supports a broad range of applications, including Marine hydraulics, marine electrical generation, for all electrical uses through coupling with DC-AC inverters to use in home and industrial robotics, integrated starter/alternators, for non-diesel, non-gasoline and non-gaseous fuel generator-sets, and large centrifugal pumps. Since DC Electricity is created by the unique method of moving the neodymium-iron-boron magnetic field through the trapezoidal bars of aluminum performing the function traditionally done by a coil rather than the traditional method of moving the coil of wire through a magnetic field an electric inverter is integrated into the system or remotely located in order to convert the DC to AC for standard utilization.

As a result of the electronic commutator, the solid state brushless DC turbo hydro generator of the present invention may also be used to directly produce DC power through high efficiency synchronous rectification. The voltage is proportional to speed computer controlled and the resultant DC power may be used for battery boosting or to power an AC inverter to convert the DC to AC for Domestic and Industrial uses. A brushless DC turbo hydro generator of the present invention the size of commercially available 6000 KW generators can produce as much as 9 to 10 times that power.

Unique Materials and Construction

The exterior stator located in the shell of the Brushless DC turbo-hydro generator of the present invention is made from heavy gauge, M15 electrical laminations, which are stacked circumferentially inside the Polymer Shell and bonded encased in polymer around the NdFeB magnetic tubine blades. Trapezoidal bars of aluminum are the circumferential stator core, exceeding 90% slot fill (compared to less than 50% for generators with traditional copper windings). Aluminum weighs less than copper thus reducing mass.

The magnetic rotor turbine blade shaft is made from precision machined titanium bar. The plurality of NdFeB magnetic turbine blade assembly has twenty four high-temperature (180° C.) neodymium-iron-boron magnets molded into and a part of the polymer turbine blades assembly located strategically on its circumference. The magnetic blades are retained with titanium bands and the rotor is balanced prior to assembly. This limits damage from water force or naturally flowing impediments not filtered by the intake assembly. In another application of the same principal all of the necessary blades can be molded around the NdFeB magnets in as a single composite unit.

As an example of commitment to high quality, high performance materials and components, Nachi or Clevite roller bearings are used throughout the turbo hydro generator of the present invention. Special molybdenum alloy 30 mm double-row angular contact bearings are can also be used. The exterior casing and support structures are carbon fiber reinforced polymer.

The rear cover is comprised of carbon fiber glass-filled, high temperature thermoplastic, or carbon fiber polymer which is precision machined. A magnetically coupled filter is added, when necessary.

BRIEF DESCRIPTION OF THE DRAWINGS

While these specifications conclude with claims particularly pointing out and distinctly claiming the subject matter that is regarded as forming the present invention, it is believed that the invention will be better understood from the following description taken in conjunction with the accompanying figures, in which:

FIGS. 1A and 1B Section 2 are neodymium-iron-boron (NdFeB) magnetic core blades shown on the interior with aluminum bars of FIG. 1B fixed in the outer shell circumference. Drive shaft retainers FIG. 1B, are for stability of the drive shaft and transfer of current to exterior power use.

FIG. 1D is a 3 dimensional rendering of the neodymium-iron-boron blades, fixed axel shaft and rear retainer assembly of the brushless DC Turbo-hydro generator.

FIG. 1E is a 3 dimensional rendering of the Polymer exterior housing of the BLDC Generator.

FIG. 1F is a magnetic front BLDC generator filter/shaft retainer assembly.

FIG. 3 is the brushless motor. The construction of the iron cored motor is turned inside out (Reversed), so that the rotor becomes the permanent magnet and the stator becomes a wound iron core.

FIG. 4 is the stator core of the BLDC Generator made of trapezoidal bars of aluminum. The stator is made from 29 gauge, M15 electrical steel laminations, which are stacked and bonded. Trapezoidal bars of aluminum are inserted into the stator core, exceeding 90% slot fill (compared to less than 50% for motors with traditional copper windings). The rotor is made from precision machined steel bar and has twelve high-temperature (180° C.) neodymium-iron-boron magnets mounted on its circumference. The magnets are retained with stainless steel bands and the rotor is balanced prior to assembly. The present invention of this disclosure utilizes laminations of polymer as the stator shell to house the Trapezoidal bars of aluminum.

FIG. 5 is a front view of a seven rotating blade assembly of the brushless DC generator in accordance with another embodiment of the present disclosure showing the inner shell (6) assembly housing the magnets. The neodymium-iron-boron magnets are molded on the inside each of the blades.

FIG. 6 is a front view of a stationary assembly of an electrical generator showing the inner brushless DC contained in the hub in yet another form of the disclosure and the integrated electronics mounted on the inner core of the blade assembly of FIG. 5 and fixed on the axel so as to create a secondary source of electrical power to control interior electronic components which adjust the angle of the NdFeB rotor blades to adjust for the varying speed of the water and cooled by the turbine action underwater. This enables the solid slot brushless motor to directly run battery or with an industry standard DC motor controller for integrated computer control components.

In FIG. 6,

Figure 1C:
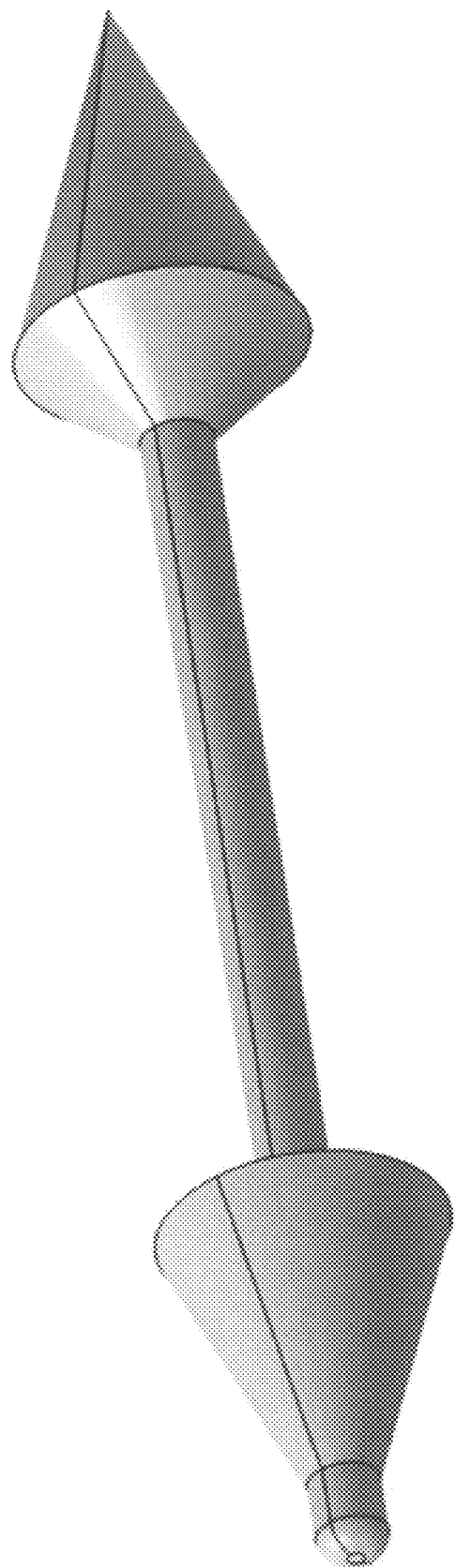
FIG. 1C is a 3 dimensional rendering of the drive shaft of the BLDC Generator.
Figure 2:
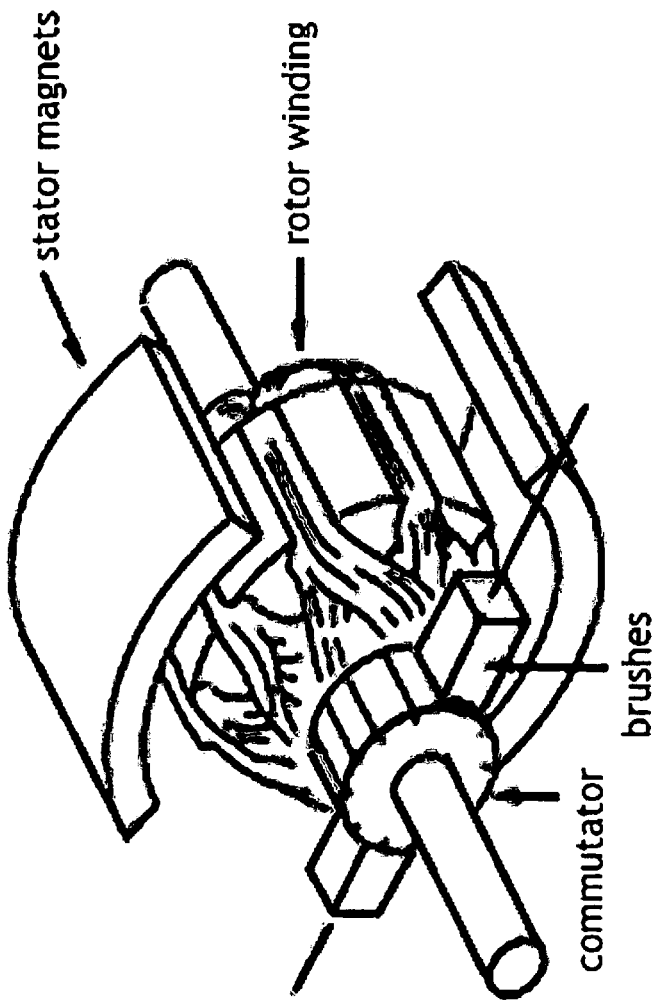
FIG. 2 is an iron-cored DC servo motor. The DC servo motor comprises a housing with field magnets and a rotor made up of coils of wire wound in slots in an iron core and electrically connected to a commutator. Brushes in contact with the commutator carry current to the coils.

"1" is the field effect transistor (FET),

"2" is the field coil,

"3" is the capacitor, and

"4-5" is the cross section fixed stationary to which the drive shaft centered on.

For increased flexibility, the electronic integrated computer can be mounted remotely and cooled by air or liquid. Thus unit utilizes computer controlled sensor and actuators to either rotate the unit to face into the water current as it changes, or change the angle of the blades of the rotor to compensate for change in direction of current flow.

Advantages

The advantages the invention has over the prior art are limited only by imagination. The Brushless DC Turbo-Hydro Electric Generator of the present invention offers a free source of "green" energy to produce unlimited electrical AC and DC power for all electrical Homes and Industrial uses.

The Brushless DC Turbo-Hydro Electric Generator of the present invention is a direct current or alternating current generating machine that eliminates the need for brushes or other mechanical commutators. In the electromagnetic version a conglomerate of opposed, spaced apart rotatable rotor turbine blades, the neodymium-iron-boron bar magnets are replaced by pieces of electromagnetic steel which interact to create a unidirectional, magnetic field created by the electromagnet loaded turbine blades each carrying specific of hybrid electromagnet bar magnets, synchronously rotated on a common axis of rotation. A stationary electrically conducting wire extends through the axis of rotation, and radially outwardly from there, between the rotating electromagnetic field. In another embodiment the neodymium-iron-boron bar magnets are replaced by pieces of conductive low oxidation metal which interrupt a unidirectional, magnetic field created by a magnet. The magnet used to create the unidirectional, magnetic field may be an electromagnet. The resultant electrical signal generated in the conductor is unidirectional. The Brushless DC Turbo-Hydro Electric Generator of the present invention may be used to create brushless DC electrical signals, brushless three-phase DC electrical signals, or a plurality of DC and/or inverted DC signals directly from the force of water action.

Thus, there is a need in the art for energy conversion devices without the complications presented by the prior art. There is a need in the art for an improved energy conversion device that generates DC electrical signals from an environmentally "green", non-polluting, zero-carbon emission, mechanical energy input, readily available without the use of brushes or other mechanical commutators.

The Brushless DC Turbo-Hydro Electric Generator of the present invention may also be coupled with industrial size DC/AC inverters for residential or industrial applications. The coastline tides and continual river flows and mountain water rundowns provide a globally available "green" source of unlimited power. Even underground rivers and water moving through "aquifers" can be used as a source of energy to drive the jet turbine style shaft of the generator.

For increased flexibility, an electronic commutator can be mounted on the drive shaft in a water-tight seated housing on the interior of the turbine blade rotor utilizing silicon seals and thus cooled by liquid. Thus unit utilizes computer controlled sensors and actuators to either rotate the unit to face into the waters current as it changes, or change the angle of the blades of the rotor to compensate for change in direction of current flow. Or, the entire unit may be duplicated and due to the smaller size the two units with opposite ends together may be simply switch back and forth, from one to the other, enabling the unit facing into the current to operate producing power while the twin unit closes down until the current changes and at that point switching back to the other unit. This doubles the lifespan of both units and cuts in half any maintenance that might be required. This dynamics may be also be utilized in situations where many different flows of constant current exist.

DETAILED DESCRIPTION OF THE PREFERRED EMBODIMENTS

This disclosure relates to a unique and advantageous brushless DC hydraulically driven turbine electrical generator. The problems of common DC electric generating machines are for the most part solved by a DC electrical generator compliant with this disclosure. The need for a mechanical rectifier may be eliminated by fixedly positioning a stationary conductor within a mechanically rotated magnetic field. More particularly, a pair of opposed hydraulically driven turbine, rotatable rotors, each carrying a plurality of bar magnets, may be mechanically rotated about an axis of rotation. Alternatively, a stationary conductor may be positioned within a magnetic field that is interrupted by hydraulically driven turbine rotatable rotors, each carrying a plurality of neodymium-iron-boron magnets, or the like. An electrically conducting wire may extend through the axis of rotation and radially outwardly there from between the rotating rotors. A DC electrical signal may be thereby generated in the conductor, without the need for a mechanical commutator and brushes.

With reference to FIGS. 1A and 1B, an electrical generator in accordance with present disclosures may be mounted on a base plate. The generator may broadly include a stationary, signal presenting, electrical conductor, a magnetic rotating assembly, and an external energy source. The electric current is produced in the trapezoidal bars by the magnetic blades rotating field.

The rotating assembly 1D may include first and second, opposed, axially aligned, rotatable shafts, or a single fixed shaft. One or each of the shafts 1-6 may be tubular, including inner and outer cylindrical surfaces. The shaft may be mounted to the base plate by a bearing mount, and may be rotatably supported on the bearing mount by one or more pillow blocks. The shaft may additionally be mounted to the base plate by a bearing mount, and may be rotatably supported on the bearing mount by one or more pillow blocks. Each of the pillow blocks may include a sleeve bearing, respectively, for rotatably supporting respective shafts. The shafts may be any suitable size, typically depending on the application of the electrical brushless DC turbo hydro generator of the present invention. The shafts may generally be long, such as one foot in length or longer, or short, such as less than one foot in length. The shafts may have any size diameter to accommodate the conductor, including any size inner cylindrical diameter with any suitable size outer cylindrical diameter.

The mutually facing ends of the axially aligned shafts may be spaced apart to present a gap between them. The opposite end of the shafts each may respectively carry a rotatable pulley.

A rotor may be fixably carried at or near the end of the shaft and a rotor may be fixably carried at or near the end of the shaft, such that the neodymium-iron-boron rotor blades are carried in opposed, generally mutually parallel orientation across the gap. The neodymium-iron-boron rotor blades may contain one or more circumferentially spaced apart bar magnets. In one embodiment, the rotor blade may include four, equiangularly, circumferentially spaced apart neodymium-iron-boron bar magnets. That is, each of the magnets is carried by the rotor blade at a common radius from the axis of rotation defined by the shafts. In other embodiments, the rotor blade may include a greater or lesser number of circumferentially spaced apart neodymium-iron-boron bar magnets, which may further be spaced apart equiangularly. The magnetic fields of each of the magnets may be aligned and parallel, and oriented in the same direction. In a further embodiment, the rotor blades may be electromagnetic. Similarly, any means for attaching the electromagnets to the rotor may be nonmagnetic.

As will be described in further detail below, in some of the preferred embodiments, such as an embodiment having an electromagnet creating a unidirectional magnetic field, the magnets may be replaced by pieces of steel or other suitable material having high magnetic permeability to interrupt the magnetic field.

In alternative preferred embodiments of the Brushless DC Turbo-Hydro Electric Generator of the present invention, a single rotor may be used in lieu of two rotors. Generally, the number of rotors used may depend on the application the electrical generator is used for and/or the size, shape, and power requirements for the application.

The Brushless DC Turbo-Hydro Electric Generator of the present invention includes means for fixably positioning a portion of an electrical conductor between the rotors. In one embodiment, a frame may be fixedly positioned within the gap between the rotors blades. The frame may be nonmagnetic polymer. In an alternative embodiment, the frame need not be positioned within the gap and may be positioned at any suitable location, such that the frame supports the electrical conductor so that a portion of the electrical conductor passes between the rotors blades. In other embodiments, a polymer frame may be unnecessary, and a portion of the electrical conductor may be held fixedly positioned within the gap by other suitable means, such as carbon fiber hangers, by tension, etc.

In yet another preferred embodiment of the Brushless DC Turbo-Hydro Electric Generator of the present invention, one or more electrical conductors may be included in the electrical Brushless DC Turbo-Hydro Electric Generator polymer frame. An electrical conductor may include an axial portion received through the tubular shaft and along the axis of rotation defined by the shafts. A conductor may also include an integral, radially extending portion, supported by the frame, and extending radially outwardly through the gap from the axis of rotation defined by the shaft, to a point extending beyond the radius defined by the aforementioned neodymium-iron-boron bar magnets. A conductor can also include an external portion. The portions of a conductor are electrically connected to each other, and to electrical load L. As shown in FIG. 6, the conductors may be interior or an array. That is, it will be seen that the electrical conductor may include a plurality of individual radial portions to provide a plurality of radially extending conductor portions within the gaps. In other embodiments, such as shown in FIGS. 5 and 6, a conductor may be aluminum rods, in series or in parallel. In this manner, wherein a portion of the conductor is received through the shaft, the conductor may always be cut in the same direction, and brushless DC electrical signals are created.

Several additional preferred embodiments of the Brushless DC Turbo-Hydro Electric Generator of the present invention are possible and in further disclosure we shall describe the details of drawings outlining the exact nature of these applications.

Although the present invention has been described with reference to preferred embodiments, persons skilled in the art will recognize that changes may be made in form and detail without departing from the spirit and scope of the invention. For example, it is recognized that a brushless turbo-hydro DC electrical generator of the present disclosure can and may be adapted, configured, or designed for any type of suitable application. For example, as previously described, an electrical generator may have more than one magnet or electromagnet, oriented in like manner or not, a case may be used instead of an electromagnet, a single rotor may be used, a conductor coil, conductor coil(s), in series or parallel, or conductor array may be used, etc. In addition, the dimensions, shape, and configuration may all be adapted for any suitable application and power requirements.

Throughout this application, there are various patents which are referenced by number and inventor. The disclosures of these patents in their entireties are hereby incorporated by reference into this specification in order to more fully describe the state-of-the-art.

It is evident that many alternatives, modifications, and variations of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

The invention claimed is:

1. A Brushless DC Turbo-Hydro Electric generator for generating electrical power from water flow, comprising:
   a composite polymer shell having an inlet, an outlet, an inner wall, an outer wall and a passage through which water may pass;
   a central shaft extending along a central longitudinal axis of the composite polymer shell;
   a first retainer connecting the central shaft to the inner wall of the composite polymer shell at the inlet; wherein the first retainer serves as an inlet debris filter;
   a rotor positioned on the central shaft, the rotor having a plurality of rotor blades extending from the rotor such that the plurality of rotor blades become a moving permanent magnetic field, wherein neodymium-iron-boron (NdFeB) permanent magnet being embedded in each of the plurality of rotor blades;
   a second retainer connecting the central shaft to the inner wall of the composite polymer shell at the outlet; wherein the second retainer serves as an outlet debris filter;
   a stator having a plurality of trapezoidal aluminum bars connected in series to each other, the stator positioned around the inner wall of the composite polymer shell and surrounded the plurality of neodymium-iron-boron (NdFeB) permanent magnet rotor blades, the plurality of trapezoidal aluminum bars insulated by non-conductive plating;
   whereby the Brushless DC Turbo-Hydro Electric Generator deploys the action of any flowing water movement on the magnetic rotor to harness wave and tidal energy.

2. A Brushless DC Turbo-Hydro Electric Generator for generating electrical power from water flow, comprising:
   a composite polymer shell having an inlet, an outlet, an inner wall, an outer wall and a passage through which water may pass;
   a central shaft extending along a central longitudinal axis of the composite polymer shell;

a first retainer connecting the central shaft to the inner wall of the composite polymer shell at the inlet; wherein the first retainer serves as an inlet debris filter;

a rotor positioned on the central shaft, the rotor having a plurality of rotor blades extending from the rotor such that the plurality of rotor blades become a moving permanent magnetic field, wherein neodymium-iron-boron (NdFeB) permanent magnet being embedded in each of the plurality of rotor blades;

a second retainer connecting the central shaft to the inner wall of the composite polymer shell at the outlet; wherein the second retainer serves as an outlet debris filter;

a stator having a plurality of trapezoidal aluminum bars connected in series to each other, the stator positioned around the inner wall of the composite polymer shell and surrounded the plurality of neodymium-iron-boron (NdFeB) permanent magnet rotor blades, the plurality of trapezoidal aluminum bars insulated by non-conductive plating; thus a plurality of NdFeB magnetic rotor blade becomes the moving permanent magnetic field and an exterior stator of aluminum bars in series around the inside of the generator housing becomes the structure in which current is created, the permanent magnets being the blades imbedded with neodymium-iron-boron; with a secondary internal self-contained electronically-controlled commutation system within the structure of the NdFeB Blade retainer for control of the blade rotational speed to account for variations in natural water flow speed and external connectors for conduction of electrical current to an exterior load;

whereby the Brushless DC Turbo-Hydro Electric Generator converts the mechanical action of any hydraulic/water movement on the magnetic turbine rotor assembly to create electrical energy.

3. A Brushless DC Turbo-Hydro Electric Generator for generating electrical power from water flow, comprising:

a composite polymer shell having an inlet, an outlet, an inner wall, an outer wall and a passage through which water may pass;

a central shaft extending along a central longitudinal axis of the composite polymer shell;

a first retainer connecting the central shaft to the inner wall of the composite polymer shell at the inlet; wherein the first retainer serves as an inlet debris filter;

a rotor positioned on the central shaft, the rotor having a plurality of rotor blades extending from the rotor such that the plurality of rotor blades become a moving permanent magnetic field, wherein neodymium-iron-boron (NdFeB) permanent magnet being embedded in each of the plurality of rotor blades;

a second retainer connecting the central shaft to the inner wall of the composite polymer shell at the outlet; wherein the second retainer serves as an outlet debris filter;

a stator having a plurality of trapezoidal aluminum bars connected in series to each other, the stator positioned around the inner wall of the composite polymer shell and surrounded the plurality of neodymium-iron-boron (NdFeB) permanent magnet rotor blades, the plurality of trapezoidal aluminum bars insulated by non-conductive plating;

whereby a magnetic field created by the magnetic NdFeB rotors cuts across the electrical conducting means of the trapezoidal aluminum bars in a uniform direction when the magnetic field is rotated (moved), inducing a unidirectional electric signal in the trapezoidal Aluminum bars connected in series utilizing an electronically controlled hard-wired commutation system as conductor for the current created to an external load.

* * * * *